Jan. 4, 1955 — B. G. SIEBRING — 2,698,507
REMOTE CONTROL LAWN MOWER
Filed Dec. 30, 1952 — 2 Sheets-Sheet 1

INVENTOR.
BARTON G. SIEBRING,
BY
McMorrow, Berman & Davidson
ATTORNEYS.

Jan. 4, 1955     B. G. SIEBRING     2,698,507
REMOTE CONTROL LAWN MOWER
Filed Dec. 30, 1952     2 Sheets-Sheet 2
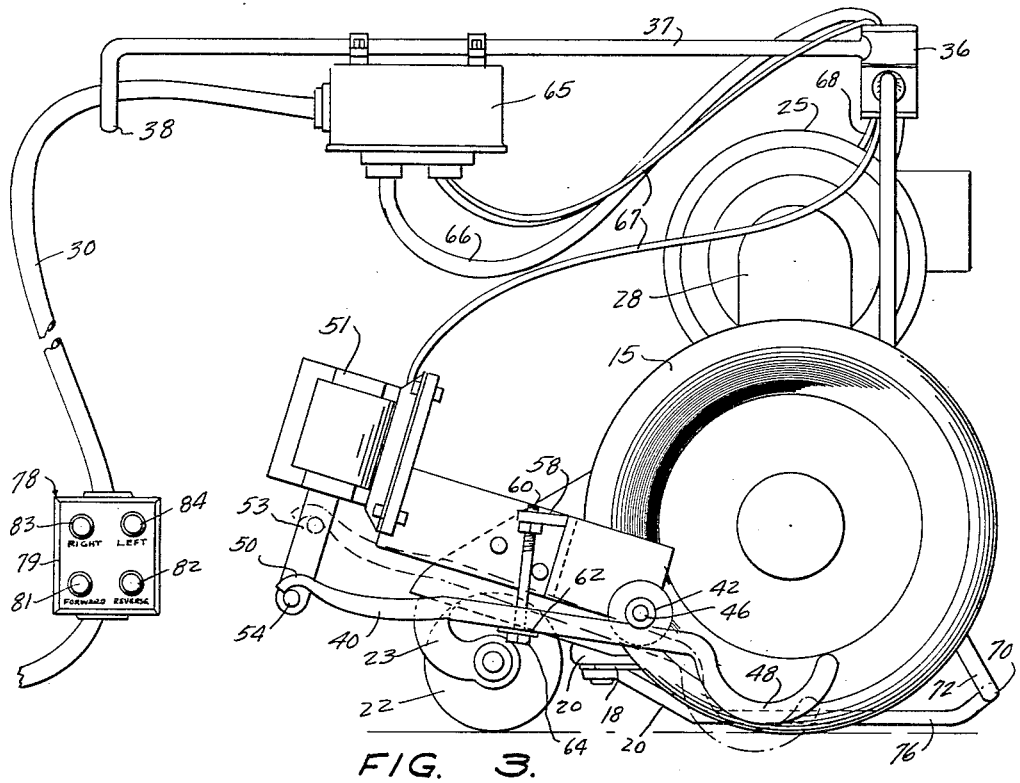
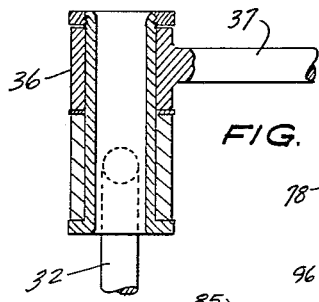
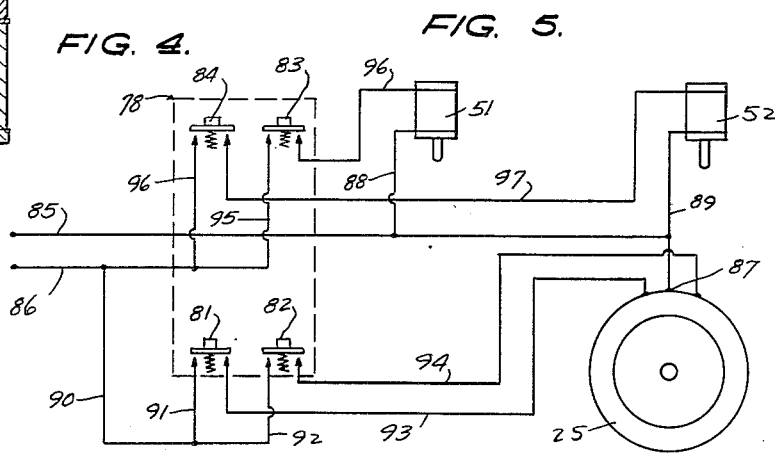
INVENTOR.
BARTON G. SIEBRING,
BY
McMorrow, Berman + Davidson
ATTORNEYS

United States Patent Office 2,698,507
Patented Jan. 4, 1955

2,698,507

REMOTE CONTROL LAWN MOWER

Barton G. Siebring, McAllen, Tex.

Application December 30, 1952, Serial No. 328,723

7 Claims. (Cl. 56—26)

This invention relates to power operated lawn mowers and more particularly to a power operated lawn mower equipped for remote control, so that the operator does not have to follow and guide the lawn mower, but can control the lawn mower without moving from a selected location.

It is among the objects of the invention to provide an improved power operated lawn mower which can be effectively controlled by an operator stationed at a selected location, so that the operator does not have to follow and guide the lawn mower; which can be controlled to move forwardly or rearwardly and to turn in either direction; which has electrically operated driving and control mechanism of simplified construction and arrangement; and which is simple and durable in construction, economical to manufacture, easy to operate, and positive and effective in operation.

Other objects and advantages will become apparent from a consideration of the following description and the appended claims in conjunction with the accompanying drawings wherein:

Figure 3 is an enlarged side elevational view of the lawn mower;

Figure 4 is a cross sectional view on an enlarged scale on the line 4—4 of Figure 2; and Figure 5 is a wiring diagram of the electric circuits of the remote control lawn mower.

Figure 1:
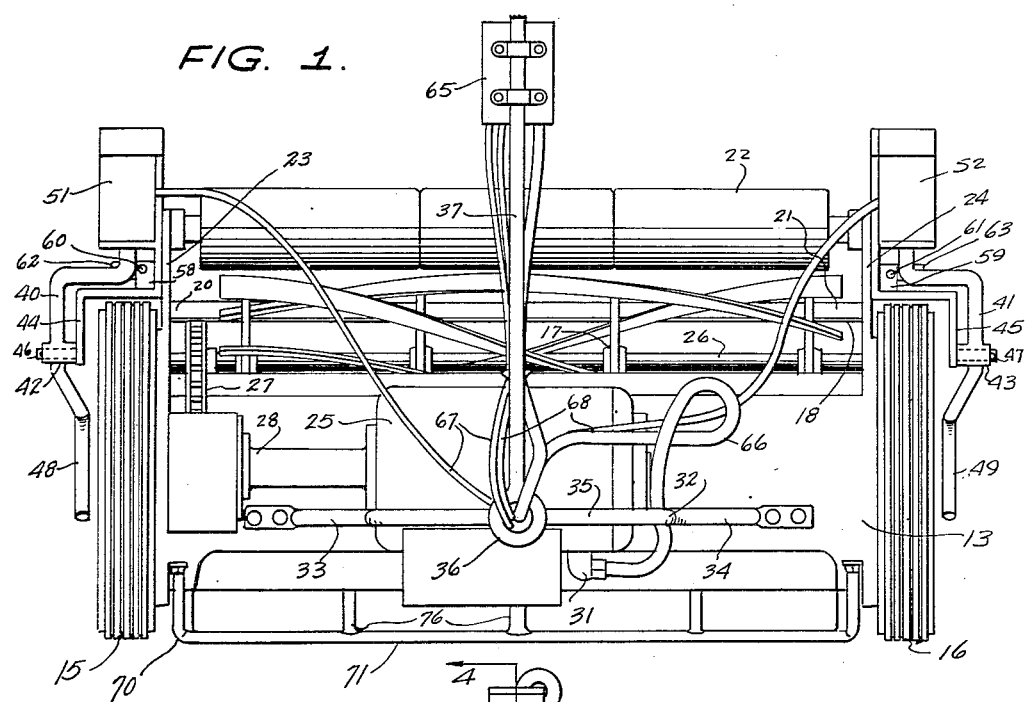
Figure 1 is a top plan view of a remote control lawn mower illustrative of the invention.
Figure 2:
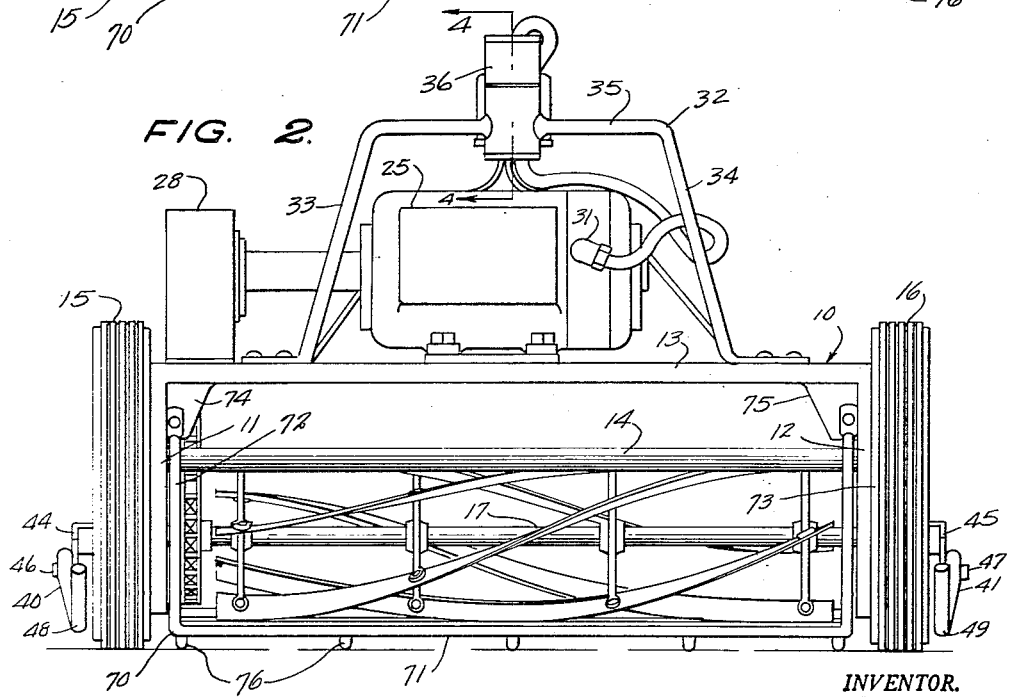
Figure 2 is a front elevational view of the lawn mower illustrated in Figure 1.

With continued reference to the drawings, the lawn mower, which may be of well known or conventional construction, has a frame, generally indicated at 10, including end members 11 and 12, a platform 13 extending between 11 and 12 at the top or upper sides of these end members, and a reinforcing bar 14 extending between and joined at its ends to the end members 11 and 12 to cooperate with the platform 13 in maintaining the end members substantially parallel to each other. Wheels 15 and 16 are journaled on the frame, one at each end of the frame, and are disposed at the outer sides of the corresponding end members 11 and 12 and a cutting reel 17 extending longitudinally of the frame below the platform 13 and is journaled at its ends in the frame end members 11 and 12 and drivingly connected to the wheels 15 and 16. A blade 18 extends longitudinally of the frame adjacent the bottom sides of the end members 11 and 12 and is secured to rearwardly projecting frame extensions 20 and 21.

A roller 22 extends longitudinally of the frame rearwardly of the blade 18 with its rotational axis below and substantially parallel to the rotational axis of the wheels 15 and 16 and the rotational axis of the reel 17 and this roller is adjustably mounted on the frame by brackets 23 and 24 disposed one at each end of the frame and projecting rearwardly therefrom. The roller 22 cooperates with the wheels 15 and 16 in maintaining the lawn mower in upright position on the ground and also is adjustable to raise or lower the level of the cutting edge of the blade 18 relative to the ground in a manner well known to the art.

An electric motor 25 is mounted on the upper side of the platform 13 and is drivingly connected to the cutter reel 17 of the lawn mower by suitable chain sprockets mounted one on the reel shaft 26 and one on the motor shaft with the sprocket on the motor shaft drivingly connected to the sprocket on the reel shaft by a chain 27. The motor shaft projects from one end of the motor and this shaft and its associated sprocket are enclosed in a housing 28, so that they are not seen in the accompanying drawings. An extension cord 30 is provided for the motor 25 and is electrically connected at one end to the motor, as indicated at 31, and has on its other end a suitable extension cord plug of well known construction, not illustrated, for insertion into a convenience outlet socket in a house wiring system.

As the electrically driven lower lawn mower so far described may be of well known construction, a further illustration and description is considered unnecessary for the purposes of the present disclosure.

A supporting wicket 32 is mounted on and extends upwardly from the platform 13, this wicket having its legs 33 and 34 secured at their distal ends to the platform 13 at locations spaced from the respectively opposite ends of the motor 25 and an intermediate portion 35 disposed above the motor and substantially parallel to the platform.

A cord guide sleeve 36 is interposed in the intermediate portion 35 of the wicket 32 substantially at the mid-length location of the intermediate portion and is so positioned that the longitudinal center line of its bore is substantially perpjendicular to the platform 13. An arm 37 is secured at one end to the sleeve 36 and projects outwardly from this sleeve substantially perpendicular to the intermediate portion 35 of the wicket 32 with its longitudinal center line substantially perpendicular to the longitudinal center line of the bore of the sleeve 36. This arm 37 extends from the sleeve 36 in a direction rearwardly of the lawn mower and a depending loop 38 is formed in the arm 37 at the end of this arm remote from the sleeve 36 for a purpose to be presently described.

Braking levers or members 40 and 41 are disposed, one at each end of the lawn mower frame 10 and at the outer sides of the wheels 15 and 16 respectively. The levers 40 and 41 each have a ground engaging end. The ground engaging ends of the levers 40 and 41 are of like contour and are indicated by the numerals 48 and 49 respectively, each ground engaging end embodying a portion adjacent the end thereof which is arcuately curved longitudinally with the convex side of such portion positioned for engagement with the ground adjacent the ground engaging peripheral part of the complemental wheel. The lever 40 is provided intermediate its length with a bearing boss 42, the bore of which extends substantially perpendicular to the length of the lever and the lever 41 is provided intermediate its length with a corresponding bearing boss 43 provided with a bore disposed substantially perpendicular to the length of the lever 41. Angle brackets 44 and 45 extend outwardly from the rear portion of the frame 13 and around the rear portions of the wheels 15 and 16 respectively, and these angle brackets carry journal pins 46 and 47 respectively, of which the journal pin 46 extends through the bore of the boss 42 on the lever 40 while the journal pin 47 extends through the bore of the boss 43 on the lever 41. The brackets and journal pins thus pivotally mount the levers 40 and 41, each lever being pivotally mounted on the lawn mower frame 13 for swinging movement in a plane parallel to that of the associated wheel from a position in which the ground engaging end lies adjacent the ground engaging peripheral part of the wheel and above the ground to a ground engaging position in which the ground engaging end is projected beyond the periphery of the wheel and into engagement with the ground to raise the wheel above the ground surface. So, when the levers 40 and 41 are selectively actuated so as to swing about the respective pivot pins 46 and 47 a braking action at the corresponding end of the frame 13 is effected, resulting in the raising of the adjacent wheel above the ground surface and causing turning of the mower by the traction of the opposite wheel about the point of engagement of the ground engaging end of the lever adjacent the raised wheel as a pivot.

Means is operatively connected to each of the levers 40 and 41 for effecting movement of the lever into its ground engaging position.

The braking levers 40 and 41 extend rearwardly from the corresponding bearing bosses 42 and 43 and are provided at their rear ends with downwardly facing hook formations, as indicated at 50 in Figure 3.

Electric solenoids 51 and 52 are mounted on the angle brackets 44 and 45, rearwardly of the wheels 15 and 16, and have their armatures substantially in alignment with the hook formations at the rear ends of the braking levers. As illustrated in Figure 3, the armature 53 of the solenoid 51 has at its lower end a transversely disposed pin 54 which engages in the hook formation 50 of the lever 40 and raises the rear end of the lever 40 when the solenoid 51 is energized to bring the longitudinally curved front portion 48 of this braking lever into braking and wheel raising engagement with the ground. The armature of the solenoid 52 is similarly connected to the rear end of the braking lever 41 and the solenoid 52, when energized, acts in the same manner to bring the longitudinally curved front end 49 of the lever 41 into braking and wheel raising engagement with the ground.

Apertured lugs 58 and 59 are mounted on the angle brackets 44 and 45 respectively, above the braking levers 40 and 41 and rearwardly of the pivot pins 46 and 47. Bolts 60 and 61 are secured at their upper ends to the lugs 58 and 59 and extend at their lower ends through apertured lugs 62 and 63 carried by the braking levers 40 and 41 respectively, rearwardly of the pivot pins 46 and 47, the bolts being provided at their lower ends with heads, as indicated at 64 in Figure 3, engaging the corresponding lever carried lugs 62 and 63 to limit downward movement of the rear ends of the braking levers.

A junction box 65 is mounted on the arm 37 intermediate the length of this arm and the extension cord 30 extends through the loop 38 at the rear end of the arm 37 and is connected into the junction box 65. A conductor 66 leads from the junction box to the motor 25, being connected to the motor at 31, as described above, and conductors 67 and 68 lead from the junction box to the solenoids 51 and 52 respectively. The conductors 66, 67 and 68 are all led through the cord guide sleeve 36 which maintains the intermediate parts of these conductors above the mower and out of contact with any of the moving parts of the mower.

An extension cord guard 70 extends between the mower wheels 15 and 16 and includes a bar 71 disposed substantially parallel to the rotational axis of the wheels 15 and 16 and at a location at which it is spaced somewhat in front of the wheels and slightly above the ground. The bar 71 has perpendicularly disposed end portions 72 and 73 which are connected at their distal ends to corner brackets 74 and 75 disposed between the frame end members 11 and 12 and the platform 13 at the corresponding ends of the platform to support the bar 71 in the position relative to the mower frame described above. Fingers 76 extend perpendicularly from the bar rearwardly of the lawn mower and under the reel 17, so that, if the mower should run over its own extension cord the fingers 76 will be interposed between the extension cord and the reel and the cord will not be cut by the reel or caught between the cutting edges of the reel and the cutting edge of the blade bar 18.

A portable switch assembly, generally indicated at 78, is connected to the extension cord 30 and includes a switch box 79 and four manually operated switches, as indicated at 81, 82, 83 and 84.

As illustrated in Figure 5, up to the switch assembly 78 the extension cord 30 is a simple, two-wire, heavy duty extension cord including the electrically insulated conductors 85 and 86. The conductor 85 is continued straight through the switch box 79 and connected at one end to the motor 25, as indicated at 87. This wire 85 is also connected to one side of the solenoid 51 by a conductor 88 and is connected to one side of the solenoid 52 by a conductor 89.

The switches 81 to 84 inclusive are illustrated as normally open switches, closed by manual pressure thereon and the switch 81 constitutes a forward drive control switch for the motor 25, while the switch 82 constitutes a reverse drive control switch for the motor. The wire 86 is connected to the switches 81 and 82 by the interconnected conductors 90, 91 and 92 and the switch 81 is connected to the motor 25 by a conductor 93. The switch 82 is connected to the motor by a conductor 94 and the three conductors 85, 93 and 94 are connected to the motor in such a manner that when the switch 81 is closed, the motor drives the associated lawn mower in a forward direction, and when the switch 82 is closed, the motor drives the lawn mower in a reverse direction.

The extension cord wire 86 is connected to the switches 83 and 84 by conductors 95 and 96 respectively, and the switch 83 is connected to the solenoid 51 by a conductor 96, while the switch 84 is connected to the solenoid 52 by a conductor 97. The solenoid 51 will thus be energized when the switch 83 is closed, and the solenoid 52 will be energized when the switch 84 is closed. If the switches 83 and 84 were simultaneously closed, energizing both of the solenoids 51 and 52, this would lift both wheels of the lawn mower from the ground and provide an emergency stop control for the lawn mower.

The flexible conductors extending between the portable switch assembly and the lawn mower are of sufficient length that the operator of the lawn mower can remain in a selected location and, holding the portable switch assembly 78, can control the movements of the lawn mower in the area adjacent the selected location, causing the lawn mower to move forwardly or rearwardly or to stop, and to turn in either direction which the operator may select. The braking levers 40 and 41 are adapted to be somewhat self-energizing in operation, so that they will engage immediately with the ground when the corresponding solenoids are energized and will not slide along the ground to any undesirable extent or fail to promptly raise the corresponding lawn mower wheel.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a power mower having a frame and a cutting means operatively mounted therein, a pair of ground engaging wheels rotatably journaled in said frame, and power means for driving said wheels, a lever having a ground engaging and pivotally mounted on the frame adjacent each wheel for swinging movement in a plane parallel to that of the associated wheel from a position in which the ground engaging end lies adjacent the ground engaging peripheral part of the wheel and above the ground to a ground engaging position in which the ground engaging end is projected beyond the periphery of the wheel and into engagement with the ground to raise the wheel above the ground surface, and single means operatively connected to each lever for effecting movement of the lever into its ground engaging position.

2. In a power mower having a frame and a cutting means operatively mounted therein, a pair of ground engaging wheels rotatably journaled in said frame, and power means for driving said wheels, a lever having a ground engaging portion on one end thereof pivotally mounted intermediate its ends on the frame adjacent each wheel for swinging movement about a horizontal axis in a plane parallel to that of the associated wheel from a position in which the ground engaging portion lies adjacent the ground engaging peripheral part of the wheel and above the ground to a ground engaging position in which the ground engaging portion is projected beyond the periphery of the wheel and into engagement with the ground to raise the wheel above the ground surface, and single means operatively connected to the other end of each lever for effecting movement of the lever into ground engaging position.

3. In a power mower having a frame and a cutting means operatively mounted therein, a pair of ground engaging wheels rotatably journaled on said frame, and power means for driving said wheels, a lever having a ground engaging portion on one end thereof pivotally mounted intermediate its ends on the frame adjacent each wheel for swinging movement about a horizontal axis in a plane parallel to that if the associated wheel from a position in which the ground engaging portion lies adjacent the ground engaging peripheral part of the wheel and above the ground to a ground engaging position in which the ground engaging portion is projected beyond the periphery of the wheel and into engagement with the ground to raise the wheel above the ground surface, and single electrically actuated means operatively connected to the other end of each lever for effecting movement of the lever into its ground engaging position.

4. In a power mower having a frame and a cutting means operatively mounted therein, a pair of ground engaging wheels rotatably journaled in said frame, and power means for driving said wheels, a lever having a ground engaging end pivotally mounted on the frame adjacent each wheel for swinging movement in a plane parallel to that of the associated wheel from a position in which the ground engaging end lies adjacent the ground engaging peripheral part of the wheel and above the ground to a ground engaging position in which the ground engaging end is projected beyond the periphery of the wheel and into engagement with the ground to raise the wheel above the ground surface, a solenoid operatively connected to each lever for effecting movement of the lever into its ground engaging position, and means operable from a remote point at the will of the operator for selectively energizing said solenoid.

5. In a power mower having a frame and a cutting means operatively mounted therein, a pair of ground engaging wheels rotatably journaled in said frame, and power means for driving said wheels, a member having a ground engaging end mounted on the frame adjacent each wheel for movement in a plane parallel to that of the associated wheel from a position in which the ground engaging end lies adjacent the ground engaging peripheral part of the wheel and above the ground to a ground engaging position in which the ground engaging end is projected beyond the periphery of the wheel and into engagement with the ground, and single means operatively connected to each member for effecting the movement of the member into its ground engaging position.

6. In a power mower having a frame and a cutting means operatively mounted therein, a pair of ground engaging wheels rotatably journaled in said frame, and power means for driving said wheels, a member having a ground engaging end mounted on the frame adjacent each wheel for movement in a plane parallel to that of the associated wheel from a position in which the ground engaging end lies adjacent the ground engaging peripheral part of the wheel and above the ground to a ground engaging position in which the ground engaging end is projected beyond the periphery of the wheel and into engagement with the ground, a solenoid operatively connected to each member for effecting movement of the member into its ground engaging position, and means operable from a remote point at the will of the operator for selectively energizing said solenoids.

7. In a power mower having a frame and a cutting means operatively mounted therein, a pair of ground engaging wheels rotatably journaled in said frame, and power means for driving said wheels, a member having a ground engaging end mounted on the frame adjacent each wheel for movement from a position in which the ground engaging end lies adjacent the ground engaging peripheral part of the wheel and above the ground to a ground engaging position in which the ground engaging end is projected beyond the periphery of the wheel and into engagement with the ground, and single means operatively connected to each member for effecting the movement of the member into its ground engaging position.

References Cited in the file of this patent

UNITED STATES PATENTS

| Number | Name | Date |
|---|---|---|
| 641,426 | Allen | Jan. 16, 1900 |
| 1,461,323 | Peters | July 10, 1923 |
| 1,490,127 | Peters | Apr. 15, 1924 |
| 1,587,083 | Neuzerling | June 1, 1926 |
| 2,104,062 | Temple | Jan. 4, 1938 |
| 2,305,072 | Fetters | Dec. 15, 1942 |
| 2,521,262 | Smith | Sept. 5, 1950 |